April 23, 1940.  A. P. VINCENT  2,198,141
CLOSED MONOBLOC POWER PLANT
Filed April 13, 1938   3 Sheets-Sheet 1
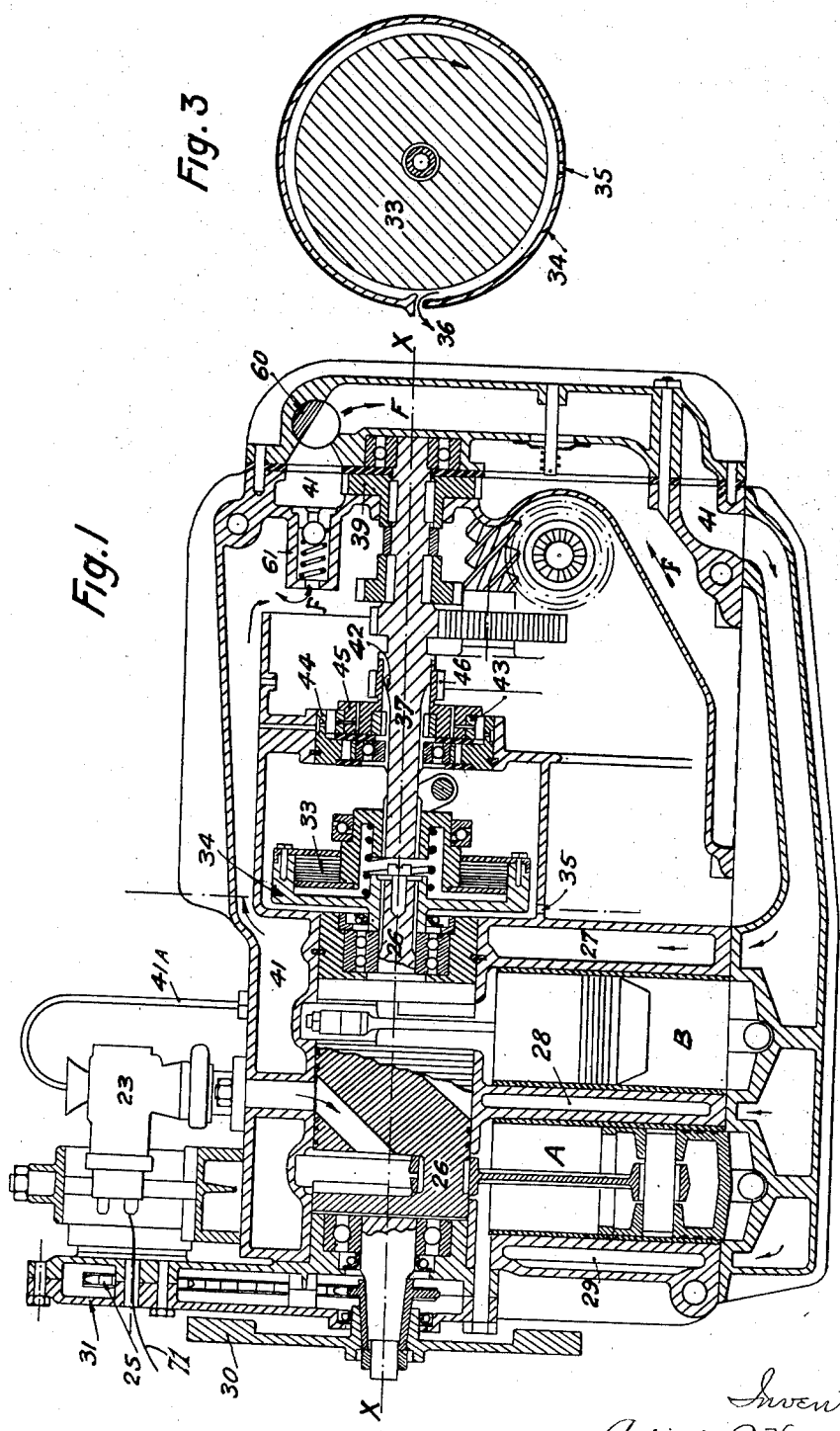
Inventor
Achille P. Vincent.
By Sommers & Young Attys April 23, 1940.                A. P. VINCENT                2,198,141
                       CLOSED MONOBLOC POWER PLANT
                         Filed April 13, 1938         3 Sheets-Sheet 2
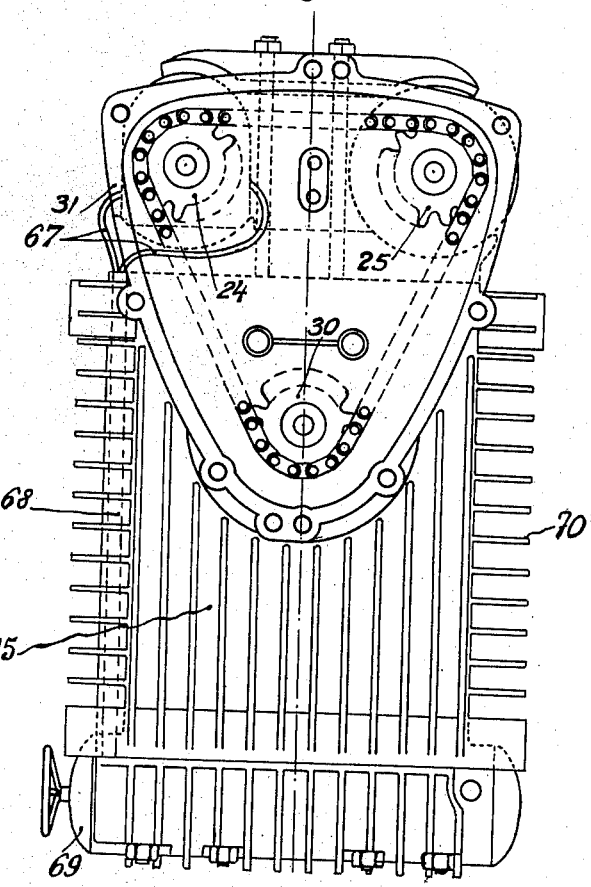
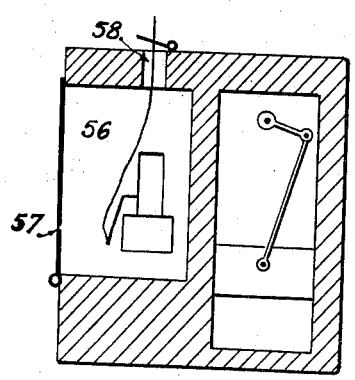

April 23, 1940.                A. P. VINCENT                2,198,141
                         CLOSED MONOBLOC POWER PLANT
                           Filed April 13, 1938          3 Sheets-Sheet 3

Inventor
Achille P. Vincent
By Sommers & Young Attys

Patented Apr. 23, 1940

2,198,141

UNITED STATES PATENT OFFICE 2,198,141

CLOSED MONOBLOC POWER PLANT

Achille Paul Vincent, Bois-Colombes, France

Application April 13, 1938, Serial No. 201,848
In France April 20, 1937

1 Claim. (Cl. 123—195)

The present invention relates to power plants, particularly for two-wheeled vehicles or motor-cycles or for automobile vehicles.

The object of the invention is to provide a power plant which is better adapted to meet the requirements of practice than those made up to the present time.

According to an essential feature of the present invention, the power plant, which may be of monobloc form, including the clutch, gear-box and transmission, is provided with ducts for the lubricating oil which are located close to the casing walls and surround the cylinder or cylinders, whereby the lubricant acts also as a cooling fluid.

According to another feature, the monobloc unit is conveniently enclosed in an oil-tight casing without projections and which carries nothing on its outer surface but cooling fins or vanes.

Other features of the present invention will be apparent from the following detailed description of some specific embodiments thereof.

A preferred embodiment of the present invention will be hereinafter described, with reference to the accompanying drawings, given merely by way of example, and in which:

Fig. 1 is a vertical section through the longitudinal axis of a power plant for a motorcycle, made according to the present invention;

Fig. 2 is an end elevation corresponding to Fig. 1;

Fig. 3 is a detail sectional view on the line III—III of Fig. 1;

Fig. 5 is a detail view corresponding to a modification.

Figure 4:
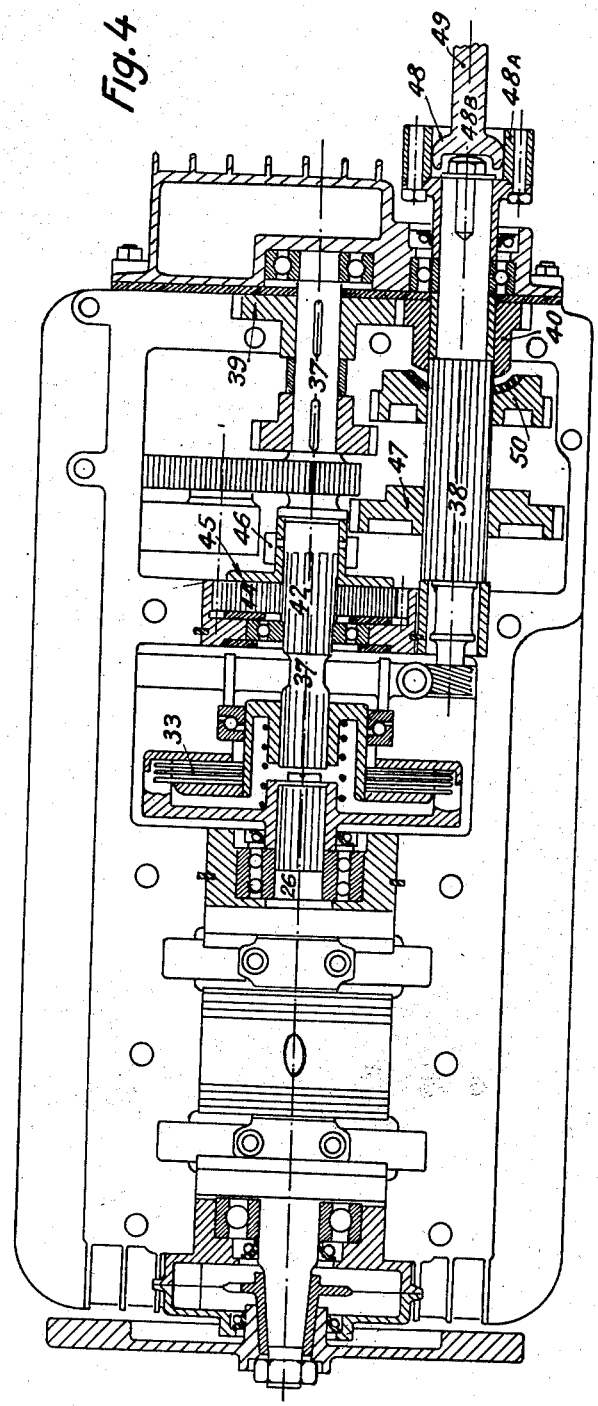
Fig. 4 is a horizontal section through the longitudinal axis.

As shown by Figs. 1, 2 and 4, the engine includes two inverted cylinders A and B, working on the well known two-stroke principle. The pistons drive a crankshaft 26. The oil level in the engine is kept slightly below the axis X—X of the crankshaft when the engine is stationary, so that oil constantly fills the spaces 27, 28 and 29 surrounding the cylinders and forming an oil reservoir. At the front, there is an ordinary fly-wheel 30, the engine ignition means and the magneto being driven through the medium of a sprocket wheel 301 on the shaft 26, which is geared to the sprockets 24 and 25.

The conductors 67, leading from the magneto to the sparking plugs, pass through an oil-tight duct 68 arranged in the cylinder block. The sparking blocks are accessible through an oil-tight door 69. If so desired, the fly-wheel is combined with the magneto. An oil-tight door 31 closes the casing or bonnet located at the front of the power plant so as to enclose the above mentioned accessory apparatus. Behind the crankshaft, there is a clutch 33 (in this case of the multiple-plate type) working in a circular casing 34. A hole 35, provided in the bottom of the casing 34, affords a constant flow of lubricant to the clutch. This lubricant, flung off by the centrifugal force resulting from the rotation of the clutch elements, is driven out through an orifice 36 of casing 34 (Fig. 3) so that the clutch plates are adequately lubricated without either excess or shortage.

The gear box (Figs. 1 and 4) is located behind the clutch 33 and it includes a driving shaft 37, in line with the crank-shaft 26, and a driven shaft 38, parallel to said driving shaft and adapted to transmit power to the rear wheel of the motorcycle.

This gear box, of the double sliding pinion type, is, as a rule of a conventional design, except for the following features:

One of the gear ratios is provided by two pinions 39 and 40 in constant mesh with each other, driven by a sliding pinion 50 having a clutch-like face adapted to coact with pinion 40, as shown. These two pinions 39 and 40 rotate in a casing which is sufficiently small and oil-tight for permitting them to act as a gear pump capable of circulating oil throughout the whole of the power plant, as shown by arrow F. A capillary duct 41a is connected to chamber 41 and, when oil is circulating, said duct feeds oil drop by drop to the carburetor 23, where it mixes with the liquid fuel, for the purpose of lubricating the cylinder walls. When the engine stops, the circulation of oil, and feed thereof to the carburetor ceases.

The means for circulating the lubricant through ducts and chambers 41 may be caused to act as a brake for the vehicle. For this purpose, a valve 60 is suitably arranged in the oil circuit, so as to brake the circulation of oil and, consequently, to act as a brake for pump 39, 40. In order to prevent an excess of pressure caused by the use of this braking valve, an adjustable safety valve 61 is provided near valve 60. This braking arrangement, which acts gradually and very smoothly, suffices in most cases to slow down the vehicle and thus saves the brake linings of the road wheels.

Another gear ratio of the gear box is obtained by means of a differential speed reducing gear, the teeth 42 of which, cut in the driving shaft 37, form the planet wheel, while 44 is the peripheral crown wheel and 43 are the differential pinions rotating on the carrier 45.

This carrier 45 is made integral with pinion 46, adapted to mesh with a pinion 47 slidable on the driven shaft 38, on which it is splined. The transmission between the driven shaft 38 and the driving wheel or wheels is obtained, for instance, by means of a coupling 48 which, in the embodiment shown by the drawing, consists of a square or polygonal socket 48a engaging a correspondingly shaped cross-head 48b on the shaft 49 which drives the rear wheel or wheels. The cross section of the surfaces of the cross-head 48b is preferably curved, as shown by the drawings, so as to enable said cross-head to act also as a swivel joint. Owing to this arrangement, the transmission can be connected or disconnected by a mere axial motion without any taking to pieces.

The power plant may include, on the cylinder side, in a modification, a chamber 56 (Fig. 5) separate from the oil circulation circuit, in which the carburetor is housed. A side door 57 gives access to this chamber and an orifice 58 communicates with the top of the engine block so as to admit air to the carburetor. This orifice may be provided with an inner filter or strainer and the carburetor controls may pass therethrough. An oil-tight seal may be provided to close this duct or orifice so that the motorcycle is wholly oil-tight so that it can be partly, or even wholly, immersed in water without damage but of course, in this case it cannot work in that state.

On the contrary, in the embodiment illustrated by Fig. 1, the carburetor is at the top of the engine, together with the valves and ignition control cable 71.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claim.

What I claim is:

A power plant assembly comprising an engine having a combustion cylinder and a crank shaft; a power transmission mechanism including a clutch and gearing located substantially in elongation of the crank shaft, said transmission gearing including a pair of meshing gear wheels; an elongated casing enclosing said cylinder, crank shaft, clutch and gearing and having an extensive exterior surface for heat dissipation, said casing providing a lubricating oil container and having thin channels in contact with the outside of the cylinder to absorb heat therefrom; means comprising casings cooperating with said clutch and meshing gear wheels for circulating the oil into contact with said clutch and through a circuit including the channels adjacent the cylinder, the crank shaft, the gearing and along the elongated casing back to the channels adjacent the cylinder; whereby the oil absorbs heat from the cylinder and transfers said heat to the elongated casing for dissipation, the agitation imparted to said oil by the shaft, clutch and gearing serving to intimately admix the hotter and cooler portions of the oil and provide uniformity of temperature throughout, and also serving as a heat accumulator for maintaining temperature of the oil as a whole more uniform.

ACHILLE PAUL VINCENT.